Feb. 28, 1950          H. G. HAAS          2,499,272
ANTIHUNTING CIRCUIT FOR ELECTRICAL REGULATORS
Filed April 19, 1948
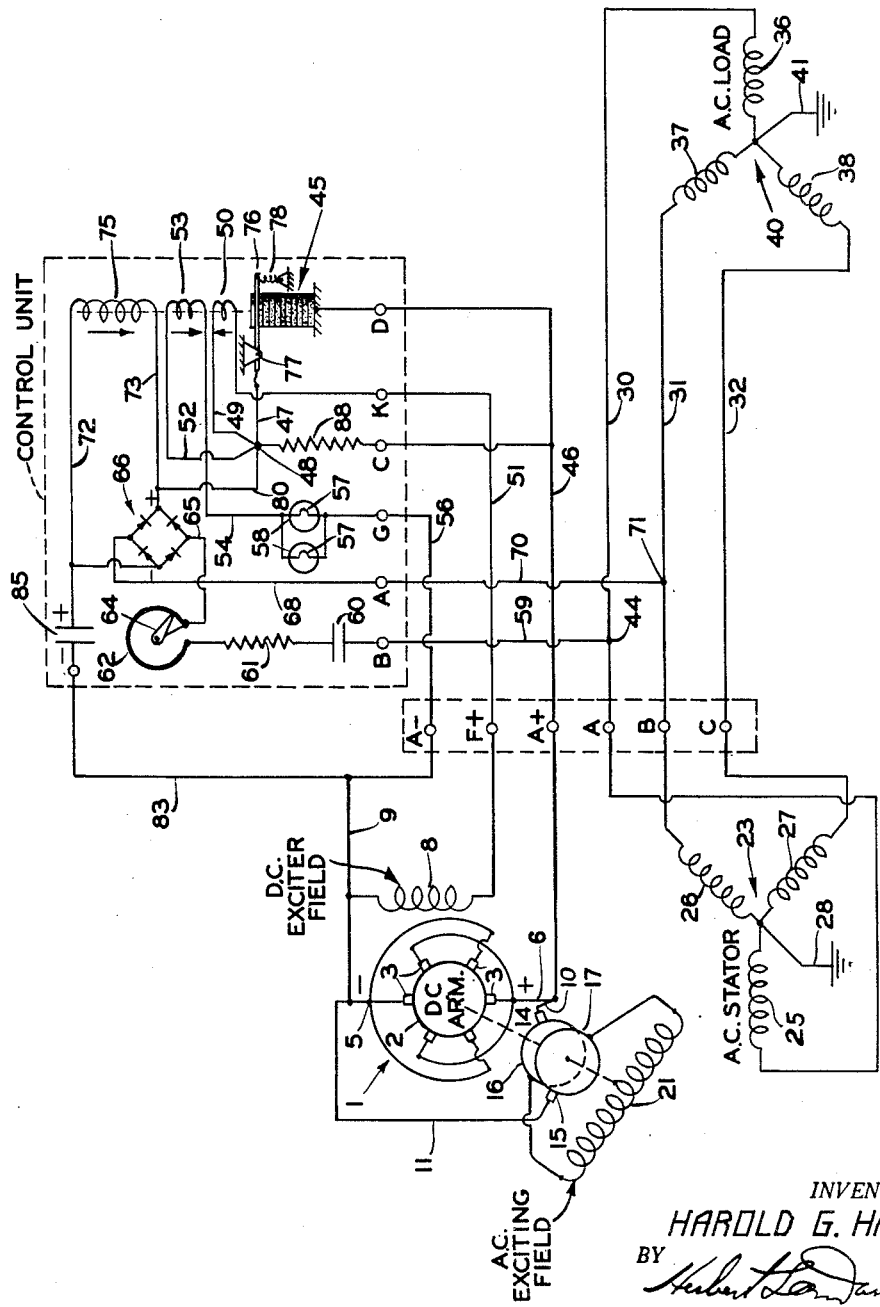
INVENTOR.
HAROLD G. HAAS
BY
-ATTORNEY- Patented Feb. 28, 1950

2,499,272

UNITED STATES PATENT OFFICE 2,499,272

ANTIHUNTING CIRCUIT FOR ELECTRICAL REGULATORS

Harold G. Haas, Belleville, N. J., assignor to Bendix Aviation Corporation, Teterboro, N. J., a corporation of Delaware Application April 19, 1948, Serial No. 21,886

4 Claims. (Cl. 322—19)

The present application relates to electrical regulators and more particularly to improvements in an electrical regulator circuit of the type shown in U. S. Patent No. 2,432,884, granted December 16, 1947, to Harold G. Haas and Joseph P. Russo and assigned to Bendix Aviation Corporation, whereby hunting of the regulator may be reduced and a controlled voltage maintained at a desired value.

An object of the invention is to provide novel means for effecting anti-hunt characteristics in a voltage regulator.

Another object of the invention is to provide a time delay action in the regulator circuit which varies with the amount of current flow across the field of an exciter generator.

Another object of the invention is to provide a regulator circuit in which there is provided a variable resistor or lamp connected across the exciter generator field and in circuit with an anti-hunt or follow-up winding and so arranged as to provide a reset time delay action which eliminates the follow-up effect.

In the latter arrangement, if the anti-hunt winding be not compensated, a droop in voltage will result with increase in load. It is, therefore, a further object of the invention to provide a load compensating winding which opposes the electromagnetic force of the main control winding and anti-hunt or follow-up winding and in which its ampere turns increase with load.

Further, in the latter arrangement, at high generator speed very little field excitation is required which in turn reduces the amount of anti-hunt correction afforded by the aforenoted variable resistance lamp circuit and it is, therefore, an object of the invention to compensate for this by providing a second anti-hunt circuit which opposes oscillatory changes in the main regulator circuit.

The above and other objects and features of the invention will appear more fully hereinafter from a consideration of the following description taken in connection with the accompanying drawing wherein one embodiment of the invention is illustrated by way of example.

The drawing is a diagrammatic view illustrating a control system embodying one form of the invention.

In the form of the invention shown in the drawing there is provided a direct current exciter generator of conventional type and indicated generally by the numeral 1.

The generator 1 has an armature winding, not shown, but which may be of conventional type. Connections from the armature winding lead to a commutator 2 having brushes 3 and electrical connections leading to output lines 5 and 6, to which there is applied by the generator 1 a negative and positive potential respectively. The generator 1 has an exciter field winding 8 connected at one end to the output line 5 by an electrical conductor 9 which also leads to a terminal A— of a generator set. The opposite end of the exciter field winding 8 is connected by a suitable electrical conductor to a terminal F+ of the generator set.

The output of the generator 1 is controlled by regulating the excitation of the field winding 8 in a manner which will be hereinafter explained.

The output of the direct current generator 1 is also connected through electrical conductors 10 and 11 to brushes 14 and 15 riding on slip rings 16 and 17 respectively, which may be mounted on the drive shaft of the generator 1, indicated by dotted line. The slip rings 16 and 17 are connected through electrical conductors 18 and 19 to an exciting field 21 of an alternator having stator windings indicated generally by the numeral 23. The exciting field winding 21 may be mounted on the same drive shaft as the armature 2 and may be rotated in relation to the stator windings 23 so as to induce an alternating current in the stator windings 23 having a value dependent upon the excitation of the winding 21.

The shaft for rotating the armature 2 and exciting field winding 21 may be driven through a suitable constant speed drive from the aircraft engine or other suitable power source.

The stator windings 23 may have windings 25, 26 and 27 grounded at one end thereof through electrical conductor 28.

The windings 25, 26 and 27 are connected to terminals A, B and C of the generator set and through suitable electrical conductors 30, 31 and 32 to stator windings 36, 37 and 38 respectively, of a suitable alternating current load 40, such as an alternating current motor or other suitable load means. The windings 36, 37 and 38 are grounded through an electrical conductor 41.

The excitation of the exciter field winding 8 is controlled preferably by a variable resistance carbon pile element 45 connected at one end by an electrical conductor to a terminal D of a control unit and from which terminal leads an electrical conductor 46 to the terminal A+ of the generator set. The terminal A+ is connected to the positive side of the generator through the conductor 6.

The opposite end of the variable resistance 45 is connected by an electrical conductor 47 to a junction 48. From the junction 48 a conductor 49 leads to one end of a load compensating winding 50.

The opposite end of the winding 50 is connected to a terminal K and the winding 50 is connected in series with the exciter field winding 8 through a conductor 51 leading from the terminal K to the terminal F+ of the generator set.

Thus the variable resistance carbon pile element 45, winding 50 and exciter field winding 8 are connected in series in a circuit leading from the conductor 6 at the positive side of the direct current generator 1 to the conductor 5 at the negative side of the direct current generator 1. Thus the winding 50 is effected by the current applied to the exciter field winding 8 and the variable resistance carbon pile element 45 is arranged to control the excitation of the exciter field winding 8, as will be explained.

There is further connected to the junction 48 through a conductor 52 one end of an anti-hunt or follow-up winding 53. The opposite end of the winding 53 is connected by a conductor 54 to a terminal G. The terminal G is connected by an electrical conductor 56 to a terminal A— of the generator set. Thus the winding 53 is connected across the exciter field 8 through conductor 51, winding 50, conductor 52 and conductors 54, 56 and 9 and is effected by the voltage applied to the exciter field winding 8 so as to temporarily inhibit further change.

Connected in the conductor 54 are filaments 57 of lamps 58 which form a part of the energizing circuit for the anti-hunt or follow-up winding 53. The filaments 57 are such that as the temperature of the filaments 57 rises with increase in current flow the resistance of the filaments 57 to current flow likewise increases with a lag in time so as to counteract the inhibiting effect and decreasing the energization of winding 53 to cause a corresponding resetting of the winding 53.

Upon a change in an opposite sense, a decrease in the current flow through the filaments 57 will cause a decrease in the temperature and in the resistance of the filaments 57 upon a similar time lag and a resetting of the winding 53 with a corresponding increase in the energization of the winding 53.

Thus the heating lag of the filaments 57 introduces a rate component into the energizing circuit for the anti-hunt winding 53.

There is connected to the conductor 30 at 44 an electrical conductor 59 which leads to a terminal B of the control unit. A capacitor 60 and resistor 61 are connected in series from the terminal B to a variable resistance element 62 having a manually adjustable arm 64 for varying the resistance thereof, for calibration purposes.

The arm 64 of the adjustable resistance 62 is connected through an electrical conductor 65 to a junction of a rectifier bridge 66. The opposite junction of the rectifier bridge 66 is connected through a suitable electrical conductor 68 to a terminal A of the control unit. Leading from the terminal A is an electrical conductor 70 which is connected at 71 to the conductor 31.

Output conductors 72 and 73 of the rectifier bridge 66 are connected to opposite ends of a main control winding 75. As to this latter arrangement, it will be readily seen that the winding 75 connected through the bridge type rectifier 66 is energized in response to the voltage output across the output lines 30 and 31 of the alternator 23.

Moreover the use of the capacitor 60 and resistor 61 combination compensates for changes in the frequency of the alternator output so as to provide a flat voltage characteristic across the lines 72 and 73 over a varying speed range of the alternator 23. This feature is disclosed and claimed in the copending application Serial No. 55,969, filed October 22, 1948, by Harold G. Haas for Electrical regulating system.

The windings 50, 55 and 75 provide electromagnetic means which are so arranged in a carbon pile regulator as to control an armature 76 and thereby the pressure applied to the carbon pile 45, as will be explained hereinafter. The regulator is shown diagrammatically in the drawing as including an armature 76 pivoted at 77 and exerting a compressive force upon the carbon pile 45 under tension of a spring 78. The spring 78 is arranged so as to balance the pull on the armature by the electromagnet 75 when energized by a line voltage having a predetermined value and is preferably of a type such as shown in the patent application Serial No. 570,002 of William G. Neild, filed December 27, 1944, now U. S. Patent No. 2,427,805, granted September 23, 1947, and assigned to Bendix Aviation Corporation.

Thus as explained in greater detail in the latter application, the regulator is arranged so as to maintain a substantially constant output voltage in the lines 30, 31 and 32 under varying load conditions.

In the arrangement of the drawing, the windings 50, 55 and 75 are each arranged in relation to the carbon pile regulator so as to apply an electromagnetic force upon the armature 76 controlling the carbon pile.

The winding 75 connected across the rectifier 66 provides the main control for the carbon pile 45 and governs the regulation thereof in accordance with voltage of the lines 30 and 31.

The lamps 58 connected in the anti-hunting circuit and across the exciter generator field 8 are arranged to provide a rate component to the energizing circuit of the anti-hunt winding 53 due to lag in the heating of the filaments 57 upon change in the current flow across the field 8.

To further amplify the rate effect of the lamps 58 the anti-hunting winding 53 is so arranged as to add to the electromagnetic force produced by the winding 75 with increase in the current across field 8. The latter action if uncompensated would cause a droop in the regulated voltage when load is applied to the alternator.

However, upon a decrease in the output voltage across lines 30—31 a decrease in energization of the main control winding 75 will result decreasing the resistance of the carbon pile 45 and increasing the excitation of the exciter field 8 and likewise increasing the energization of winding 53 which acting with winding 75 will tend to temporarily inhibit further decrease in the resistance of the carbon pile 45. An increase in the energization of winding 53 will likewise increase the temperature of the filaments 57 and the resistance thereof after a time lag. The increase in the resistance of the filaments 57 will in turn reset the winding 53 by decreasing the energization thereof. An increase in the output voltage will have the opposite anti-hunting effect.

Further, in order to overcome the aforenoted drooping voltage effect, the compensating winding 50 is connected so as to oppose the magnetic force of the main control winding 75 and the magnetic force of the anti-hunting winding 53. The winding 50 is connected in series with the exciter field 8 and so that its ampere turns increase upon decrease in the resistance of the carbon pile element 45. The latter decrease in resistance of the carbon pile element 45 may be caused in turn by an increase in the load applied to the output of the alternator 23. Thus the ampere turns of the load compensating winding 50 varies with load so as to compensate for a voltage droop introduced by the anti-hunting winding 53.

At high generator speed very little excitation of the field 8 is required which in turn reduces the amount of anti-hunt correction afforded by the excitation circuit for the anti-hunt winding 53 including the lamps 58.

To compensate for this condition a second anti-hunt circuit is provided including conductor 80 which leads from conductor 73 to junction 48 and a second conductor 83 which leads from conductor 72 to conductor 9 and in which there is connected a capacitor 85. This circuit opposes oscillatory changes in the main control circuit of the winding 75 and serves to filter some of the pulsating D. C. from the main control circuit.

Thus, for example, upon a decrease in the output voltage across the lines 30 and 31 decreasing the energization of the main control winding 75, the armature 76 would tend to decrease the resistance of the carbon pile element 45 so as to effect a momentary increase in the energization of the main control winding 75 through the second anti-hunt circuit, including conductor 83, capacitor 85, conductor 72, winding 75 and conductors 73 and 80, which momentary energization tends to retard further decrease in the energization of winding 75.

Similarly upon an increase in the output voltage across lines 30 and 31 tending to increase the resistance of the carbon pile element 75, the capacitor 85 tends to divert electronic flow from the winding 75 so as to momentarily decrease the energization of the winding 75 and tend to retard further increase in the energization of the winding 75.

A resistor 88 is connected between the junction 48 and the conductor 46 to limit the maximum resistance of the carbon pile element 45.

Although only one embodiment of the invention has been illustrated and described, various changes in the form and relative arrangement of the parts may be made to suit requirements.

What is claimed is:

1. A regulator for a generator supplying line current to a variable load and including an exciter field, comprising a variable resistor, an armature operatively connected thereto, a spring biasing a portion of the armature to tend to operate said resistor in the direction to produce an increase in the exciter field current, a first winding tending to operate the armature in the opposite direction upon an increase of the regulated quantity, a second winding acting upon the armature as a follow-up promptly limiting the change of resistance of said resistor upon a change of said quantity, a reset means connected in series with said second winding across the exciter field, said reset means including a second variable resistor element arranged so as to increase the resistance of said series connection with current flow in a retarded manner so as to substantially eliminate the stated follow-up.

2. The combination defined by claim 1 including a third winding acting upon the armature in opposition to said first and second windings and carrying the exciter field current to compensate the regulator for changes in said variable load.

3. A regulator for a generator supplying line current to a variable load and including an exciter field, comprising a variable resistor, an armature operatively connected thereto, a spring biasing a portion of the armature to tend to operate said resistor in the direction to produce an increase in the exciter field current, a first winding tending to operate the armature in the opposite direction upon an increase of the regulated quantity, a second winding acting upon the armature as a follow-up promptly limiting the change of resistance of said resistor upon a change of said quantity, a lamp filament connected in series with said second winding across the exciter field, said lamp filament having a resistance which increases in a retarded manner with increase in current flow so as to gradually eliminate the stated follow-up, and a third winding acting upon the armature in opposition to said first and second windings and carrying the exciter field current to compensate for changes in said variable load.

4. For use with a generator supplying line current to a variable load and including an exciter field; a regulator comprising a carbon pile, an armature operatively connected thereto for varying the electrical resistance of said carbon pile, a spring biasing a portion of the armature to tend to adjust said carbon pile in a direction to produce an increase in the exciter field current, a first electromagnetic winding tending to operate the armature in the opposite direction in response to an increase in the line voltage of said generator, a second electromagnetic winding, means connecting said second winding across the exciter field winding, said second winding acting upon the armature as a follow-up limiting the change of resistance of said carbon pile, said last mentioned connecting means including a lamp filament having a resistance which increases in a retarded manner with increase in current flow so as to gradually eliminate the stated follow-up, a third electromagnetic winding acting on said armature in opposition to said first and second electromagnetic windings, said third winding connected in series with the exciter field and responsive to changes in the exciter field current to compensate for changes in said variable load.

HAROLD G. HAAS.

REFERENCES CITED

The following references are of record in the file of this patent:

UNITED STATES PATENTS

| Number | Name | Date |
| --- | --- | --- |
| 2,067,004 | Godsey | Jan. 12, 1937 |